G. H. FORSYTH.
APPARATUS FOR ELECTRIC WELDING.
APPLICATION FILED MAY 3, 1915.
1,375,687.
Patented Apr. 26, 1921.
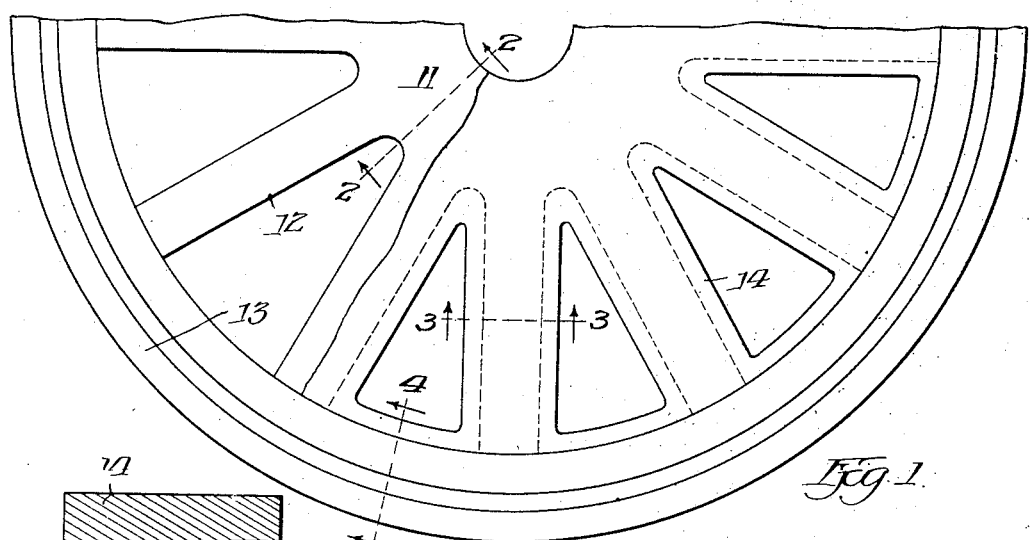
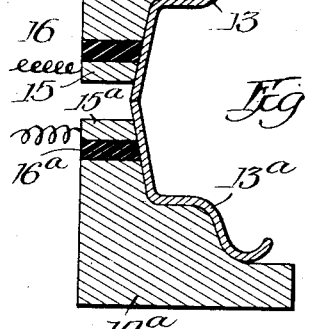
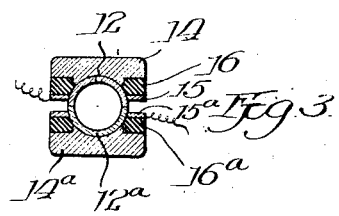
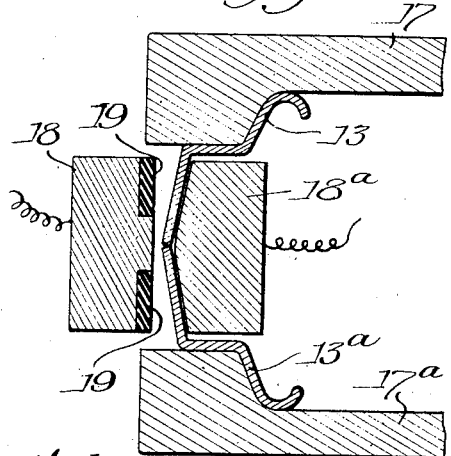
Witnesses:
Inventor
George H. Forsyth

UNITED STATES PATENT OFFICE.

GEORGE H. FORSYTH, OF CHICAGO, ILLINOIS.

APPARATUS FOR ELECTRIC WELDING.

1,375,687.  Specification of Letters Patent.  Patented Apr. 26, 1921.

Application filed May 3, 1915. Serial No. 25,355.

*To all whom it may concern:*

Be it known that I, GEORGE H. FORSYTH, a citizen of the United States, residing at Chicago, in the county of Cook and State of Illinois, have invented certain new and useful Improvements in Apparatus for Electric Welding, of which the following is a specification.

The invention has for its primary object the application of a welding heat to the abutting edges of members having an extended area of contact in such manner as to bring all the meeting portions over such extended area to a welding temperature simultaneously.

A characteristic feature of the invention is the provision of means whereby the heating medium, whether a flame or an electric current, is applied simultaneously throughout the extent of the abutting surfaces and also confined locally thereto as distinguished from the application of welding heat progressively along the meeting line of surfaces to be welded and from the application of an electric current, for instance, to the article at a considerable distance from the abutting edges.

Where extended areas are to be united and particularly in the case of surfaces divided into a number of isolated portions as typified by metal wheel construction it has been found to be exceedingly difficult to effect a uniform junction of parts for the reason that in the welding the heated portions yield toward each other under the pressure of the clamping members while those portions which have not yet been subjected to the welding heat resist the clamping action and maintain their original position thus leading to a deformation with a resultant lack of symmetry in the completed article.

It has been proposed to weld articles having an extended line of contact by constituting the two portions to be welded the positive and negative electrodes of a welding electric current. In such cases, however, the waste of current has been enormous owing to the heating of the whole article in order to bring its abutting edges to a welding temperature.

According to the present invention these objections are overcome by heating the abutting edges simultaneously throughout their extent and at the same time confining the application of heat locally along the line of contact and, in the case of electric current, bringing the electrodes into contact with the article immediately adjacent the line of contact so that the article is heated only along its abutting edges.

While the invention is thus applicable to a wide range of uses, it is particularly advantageous as applied in the welding of sheet metal halves of various objects such for instance as sheet steel wheels for vehicles and it is in connection with such use that the invention is herein illustrated and described. In the accompanying drawings—

Figure 1 is a fragmentary top plan view showing the invention as applied to the hub, rim, and spokes of a sheet metal wheel;

Figs. 2, 3 and 4 are transverse sections on the line 2—2, 3—3, and 4—4 respectively of Fig. 1; and Fig. 5 is a view similar to Fig. 4 but of a modification.

As illustrated the reference numerals 11 and 11ª represent coöperating hub portions of the upper and lower halves of a sheet metal wheel, 12 and 12ª the spoke portions of the upper and lower halves respectively, and 13 and 13ª the rim portions of the upper and lower halves, the said upper and lower halves of the wheel being held in pressure contact between clamping members 14 and 14ª bearing respectively upon the upper and lower sides of the hub, spoke and rim portions.

The clamping members have a face contour conforming marginally to that of the hub, spoke and rim portions of the wheel halves so as to maintain the wheel halves in appropriate pressure contact without deformation, the margins of the clamping members having a spaced relation to each other.

Along their margins, having reference to Figs. 1 to 4 inclusive, the upper and lower clamping members carry positive and negative electrodes 15, 15ª, which form a continuation of the clamping members but are isolated therefrom by insulation 16, 16ª. These electrodes are in electrical contact with the upper and lower halves of the wheel portions immediately adjacent the line of abutting contact, between the wheel halves so that the electric current flows from the electrode 15 through the marginal portion of the wheel halves to the electrode 15ª, bringing the abutting edges of the halves to a welding heat without the current being dissipated through the body of the articles or wasted in heating the same other than locally.

Referring to Fig. 5, I have illustrated the application of the same principle in a slightly different manner. Herein the clamping members numbered 17 and 17ª form no part of the means for applying a current but serve only to confine the wheel halves against separation during welding. In this embodiment the electrodes 18 and 18ª are applied one within and the other without the meeting edges of the article, the application of the current being confined locally along the line of contact by means of the insulation 19, although the same result might be obtained in this form of the invention by so shaping the electrodes that they would contact with the wheel halves only along a limited area including the abutting edges of the parts. Having reference to this figure the electrode 18ª might well be in the form of a continuous band lying within the rim of the wheel while the electrode 18 represents one of a plurality of triangular shaped electrodes fitting within the spaces between the several spokes.

In both forms of construction the operation is the same, the current being applied to the electrodes, the welding operation will take place simultaneously throughout the extended line of surfaces in abutting contact, and being confined locally to such line of contact the current will be conserved and the operation will be both efficient and economical. Moreover, by reason of the holding of the surfaces in pressure contact so that the heated edges will yield and approach one another, the use of a wire insert in the space between the edges, as is usual in flame welding, is obviated.

I claim:

1. In an apparatus for welding articles having an extended line of abutting edges, clamping members arranged on opposite sides of and throughout the line of contact between the articles, and electrodes carried by said members, the electrical contact between the electrodes and the articles to be welded being confined locally adjacent the abutting edges.

2. In an apparatus for welding articles having an extended line of abutting surfaces, clamping members for holding the abutting surfaces in pressure contact, and electrodes carried by said members and forming a part of but insulated from the main body thereof, the electrical contact between the electrodes and the articles to be welded being confined locally adjacent the abutting surfaces.

3. In an apparatus for welding articles having an extended line of abutting surfaces, a pair of opposed clamping members, and a pair of electrodes carried by but insulated from the clamping members and contacting with the articles adjacent the line of contact therebetween.

4. In an apparatus for welding articles having an extended line of abutting surfaces throughout the line of contact simultaneously, a pair of opposed clamping members for holding the surfaces in contact, and a pair of electrodes carried by but insulated from the clamping members and contacting with the articles adjacent and throughout the extent of the line of contact therebetween.

5. In an apparatus for welding articles having an extended line of abutting edges, clamping members arranged on opposite sides of the line of contact between the articles, and electrodes, the electrical contact between the electrodes and the articles to be welded being confined locally adjacent the abutting edges.

6. In an apparatus for welding articles having an extended line of abutting surfaces, a pair of opposed clamping members acting in a line substantially normal to the abutting surfaces, and a pair of electrodes carried by but insulated from the clamping members and contacting with the articles adjacent the line of contact therebetween.

In testimony whereof I have hereunto signed my name in the presence of two subscribing witnesses.

GEORGE H. FORSYTH.

Witnesses:
  M. C. BROWER,
  T. D. BUTLER.